United States Patent Office 3,758,489
Patented Sept. 11, 1973

3,758,489
1,3,2-OXAZABORINIDES AND METHOD FOR PREPARING THE SAME
Thurairajah Padmanathan, Highland Park, N.J., assignor to American Cyanamid Company, Stamford, Conn.
No Drawing. Original application May 27, 1968, Ser. No. 732,045, now Patent No. 3,621,023, dated Nov. 16, 1971. Divided and this application Apr. 19, 1971, Ser. No. 135,360
Int. Cl. C07d *107/02*
U.S. Cl. 260—304   1 Claim

ABSTRACT OF THE DISCLOSURE

The 1,3,2-oxazaborinide of the formula

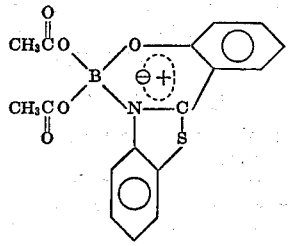

is characterized by affinity for polyesters, nylon and acetate when applied by disperse dyeing methods and fluoresces on the fibers.

---

This application is a divisional of application Ser. No. 732,045, filed May 27, 1968, now U.S. Pat. No. 3,621,023.

This invention relates to new heterocyclic compounds containing boron and to certain non-boron intermediates which are outstanding for use as fluorescent disperse dyes. It also relates to a novel method for the preparation of certain of the boron-containing compounds.

Especially this invention relates to 1,3,2-oxazaborinide compounds represented by the formula:

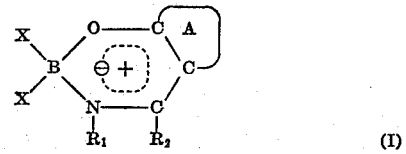
(I)

wherein A is the residue of an active ketomethylene compound from which the 1-oxo group is derived, X is halogen or acyloxy; $R_1$ and $R_2$ are selected from the group consisting of H, lower alkyl and aryl, individually, or which together with the —N—C— group to which they are attached form an azole. These compounds are characterized by their ability to dye synthetic fibers, especially polyester, nylon and acetate, giving mainly yellow to orange to red hues of good fastness to light. The dyed fibers show bright fluorescence in ultraviolet light of yellow to orange to red.

In practicing this invention, a condensate of the formula represented in a keto and enol form,

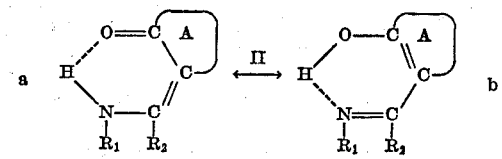

wherein A, $R_1$ and $R_2$ are defined as above, is reacted with either:

(1) A boron trihalide, such as boron trifluoride or trichloride, in an inert solvent to give a 1,3,2-oxazaborinide represented by the Formula I above, X being fluoro or chloro. The boron trihalide is used in excess. Being gaseous at ordinary temperature it is usually dissolved in an inert organic solvent carrier for addition, such as diethyl ether. It is added to the condensate "a–b," in a solvent inert to both, such as acetic acid, xylene, chloroform, or nitrobenzene. The reaction is carried out at reflux. The 1,3,2-oxazaborinide is isolated by pouring the reaction mixture on to crushed ice. The separated product is filtered, washed with water and recrystallized from solvents such as chloroform or dimethylformamide, xylene or benzene.

(2) Ortho boric acid, $B(OH)_3$, or its derivative benzeneboronic acid, $Ph\ B(OH)_2$, in acetic acid in the presence of acetic anhydride to give a diacetoxy 1,3,2-oxazaborinide (X=acetoxy). This reaction is also carried out at reflux. The product is insoluble in the cold reaction mixture. Other boronic acids such as benzyl or alkylboronic acids are equally operable. The reaction to give the diacetoxy analogue is unexpected and is an embodiment of this invention, or (3) The difluoro 1,3,2-oxazaborinide prepared above can serve as a starting material instead of II above for the preparation of the diacetoxy 1,3,2-oxazaborinide.

As starting materials of types II a and b, there may be used condensates formed by reaction of an o-hydroxy aromatic aldehyde with an aromatic amine, exemplified by Example 15. This gives an azomethine compound in which $R_1$ and $R_2$ are H, lower alkyl or aryl: e.g., Aldehyde:
  o-hydroxybenzaldehyde
  2-hydroxy-1-naphthaldehyde
  1-hydroxy-2-naphthaldehyde
  3-hydroxy-2-naphthaldehyde
Amine:
  m- or p-anisidine
  m- or p-phenetidine These and their ring-substituted derivatives are known solids. Their preparation is given in the art.

Another class of starting material is type II a and b above, where $R_1$ and $R_2$ form an azole.

One subgeneric type of this class is a 2-(o-hydroxyphenyl)benz-azole such as:

2-(o-hydroxyphenyl)benzoxazole
2-(o-hydroxyphenyl)benzothiazole
2-(o-hydroxyphenyl)benzimidazole These compounds and their ring-substituted derivatives are known in the art as for example U.S. Pats. 2,995,540 and 3,049,509. Their use is described in Examples 1 and 2.

The 1,3,2-oxaborinides have been represented by Formula I above but could also be represented in four other ways as represented by the following formulas:

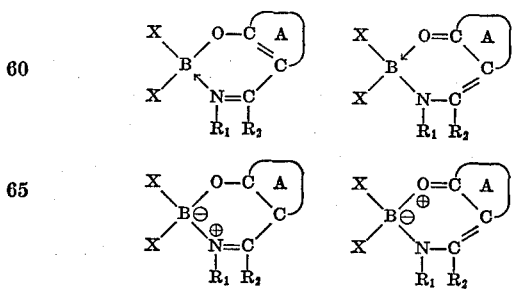

A preferred embodiment of this invention is the diacetoxy 1,3,2-oxazaborinide (X=acetoxy) which has been found to be especially stable. This forms in acetic acid in the presence of acetic anhydride. Even when benzeneboronic acid, PhB(OH)$_2$, is used and the expected product is a monohydroxy monophenyl 1,3,2-oxazaborinide, the phenyl group is not found attached to the boron in the final product. It is split off and the diacetoxy borinide formed instead. The diacetoxy 1,3,2-oxazaborinides are distinct from diphenyl 1,3,2-oxazaborinides of the art because they have greater fluorescence.

Many of the 1,3,2-oxaborinides of this invention are useful for coloring varnishes, resins and plastics, such as poly(methyl methacrylate), nitrocellulose, polyethylene and polystyrene. They fluoresce in these substrates. They are most useful where intense heat and light are not a factor. Their fluorescence on synthetic fibers as mentioned above is also of commercial interest and their stability to light on the fiber is good. All of the fibers mentioned may be dyed by the procedure of Example 6.

The following examples illustrate this invention.

EXAMPLE 1

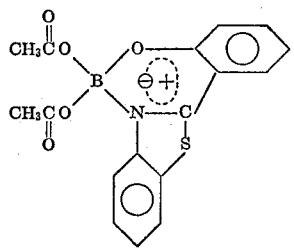

To 5 g. 2-(o-hydroxyphenyl)-benzothiazole in 50 ml. acetic acid, is added 1.6 g. boric acid and 25 ml. acetic anhydride. The whole is heated at reflux for three hours, cooled, filtered and the product dried. The product is washed with ether and dried to give 5.3 f., M. 252–53° C.

This compound has strong affinity for polyester. Although colorless in daylight, it fluoresces a strong light yellow under ultraviolet light. (It has no affinity for polyacrylonitrile or wool.) It has some affinity for acetate and nylon. It fluoresces light yellow on these fibers.

EXAMPLE 2

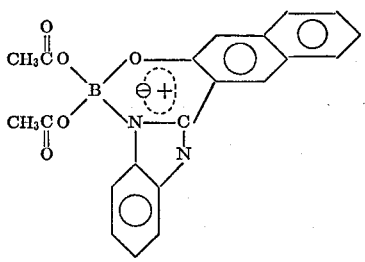

To 1.0 g. 3-(benzimidazol-2-yl)-2-naphthol discovered by J. L. Rodgers, in 50 ml. acetic acid and 10 ml. acetic anhydride is added 0.28 g. boric acid. The whole is heated at reflux for two and one-half hours, filtered and the product dried; 0.65 g., M. 288° C.

Although colorless on synthetic fibers, it has affinity and fluoresces on them. It has strong affinity for polyester, fluorescing medium coral shades. On nylon it fluoresces a light orange. For acetate, it has slightly less affinity and fluorescence.

If in the above procedure the 3-(benzoxazole-2-yl)-2-naphthol is used instead of the imidazole a product of similar substantivity and fluorescence is obtained.

EXAMPLE 3

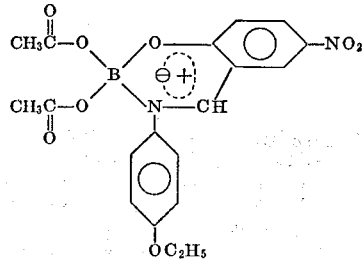

To 2 g. N-(2-hydroxy-5-nitrobenzylidene)-p-phenetidine and 1 g. phenylboric acid in 30 ml. acetic acid at reflux, is added 5 ml. acetic anhydride. After heating at reflux for one hour, the whole is cooled and filtered to give 1.0 g. product, M. 240–1° C.

This compound gives light yellow shades on polyester, nylon, acetate and modified polypropylene. However, it is of special interest because of its intense light yellow fluorescence on polyester. The fluorescence is also indicative of the strong affinity this compound has for that fiber.

EXAMPLE 4

The difluoro analogue of the product of Example 14 is prepared as follows:

To a refluxing mixture of 1.0 g. N-(2-hydroxy-5-nitrobenzylidene)-p-phenetidine in 50 ml. refluxing xylene, is added 1 ml. boron trifluoride etherate (of Example 2). An immediate precipitate forms which dissolves on further refluxing. After three hours at reflux the whole is cooled, filtered and the product dried to give 1.05 g., M. 210–11° C.

The product dyes polyester, nylon and acetate light yellow shades. On polyester is has a light green-yellow fluorescence.

EXAMPLE 5

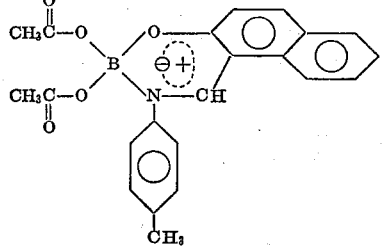

To a solution of 5.22 g. N-(2-hydroxy-1-naphthylidene)-toluidine in 50 ml. acetic acid is added 2.5 g. phenylboric acid. The whole is heated at reflux for 1.25 hours, cooled and the product filtered, washed with 20 ml. ethanol and dried to give 2.0 g., M. 218–20° C.

If boric acid is used instead of phenylboric acid, the same product is obtained. It dyes polyester, nylon and acetate, a light green yellow.

It imparts a light green-yellow to poly(methyl methacrylate) lacquer in 0.125% conc. which fluoresces bluish white under UV light. When applied over black, a slightly bluish case is apparent.

EXAMPLE 6

Disperse dyeing procedure

A stock dye solution prepared by dissolving 175 mg. dye in 20 to 30 cc. acetone. This is added to a solution prepared by mixing 7 cc. 5% sodium lauryl sulfate solution in 100 cc. water at 120° F. The volume is brought to 350 cc. volume with water at 100 to 120° F.

A 50 cc. portion of the above dye stock solution is added to 150 cc. water. In the case of dyeing polyesters, a carrier is used in the dyebath. The amount of carrier used in 3 ml. of a 50% methyl salicylate aqueous emulsion.

A 5-gram skein of fibers of the type mentioned below is introduced. The dyebath is heated to the temperature indicated and dyed for one hour at that temperature. It is removed and rinsed. Two of the types scoured after dyeing, polyester and modified polypropylene. Scouring is done for 10 minutes at the boil in 0.1% neutral soap solution followed by rinsing. The skeins are dried.

The same procedure may be followed with 5-gram pieces of fabric instead of yarn or skeins.

Fibers dyed

| | °F. |
|---|---|
| Polyester (polyethylene terphthalate) | At 212 |
| Nylon 66 carpet yarn | At 205 |
| Acetate (cellulose acetate) | At 205 |
| Polypropylene, modified with an amine or amide | At 212 |
| Polyacrylonitrile, modified with an amine or amide | At 212 |

A 0.5% shade of dye on the weight of the yarn or fabric is obtained by this procedure. This is the depth of shade described in the examples unless otherwise noted.

I claim:
1. The 1,3,2-oxazaborinide of the formula

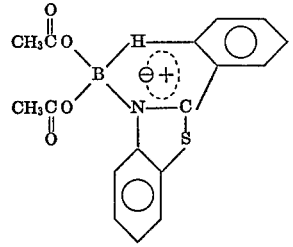

References Cited
UNITED STATES PATENTS
3,669,985    6/1972    Padmanathan _____ 260—310 A ALEX MAZEL, Primary Examiner
R. D. McCLOUD, Assistant Examiner